United States Patent [19]

Maucher et al.

[11] Patent Number: 4,523,558
[45] Date of Patent: Jun. 18, 1985

[54] INTERNAL COMBUSTION ENGINE AND CLUTCH THEREFOR

[75] Inventors: Paul Maucher, Sasbach; Oswald Friedmann, Lichtenau, both of Fed. Rep. of Germany

[73] Assignee: Luk Lamellen und Kupplungsbau GmbH, Bühl, Fed. Rep. of Germany

[21] Appl. No.: 559,232

[22] Filed: Dec. 8, 1983

[30] Foreign Application Priority Data

Dec. 8, 1982 [DE] Fed. Rep. of Germany ....... 3245361

[51] Int. Cl.³ .............................................. F02D 25/04
[52] U.S. Cl. .............................. 123/198 F; 123/52 A; 60/718
[58] Field of Search .................... 123/198 F, 52 A; 60/718

[56] References Cited

U.S. PATENT DOCUMENTS 4,069,803  1/1978  Cataldo ........................... 123/198 F
4,373,481  2/1983  Kruger et al. .................... 123/198 F
4,389,985  6/1983  Huber et al. ..................... 123/198 F
4,394,854  7/1983  Huber ............................. 123/198 F

FOREIGN PATENT DOCUMENTS 2828298  1/1980  Fed. Rep. of Germany .

*Primary Examiner*—Ira S. Lazarus
*Attorney, Agent, or Firm*—Peter K. Kontler

[57] ABSTRACT

A split internal combustion engine wherein a first unit having one or more cylinders can be coupled to a second unit by an accelerating friction clutch. Direct torque-transmitting connection between the crankshafts of the two units is established in automatic response to acceleration of the second unit to a speed such that its crankshaft slightly overtakes the crankshaft of the first unit. The mechanism which serves to effect direct transmission of torque between the two units is designed to eliminate play between such units as well as to compensate for wear upon its parts and the parts of the clutch.

21 Claims, 6 Drawing Figures

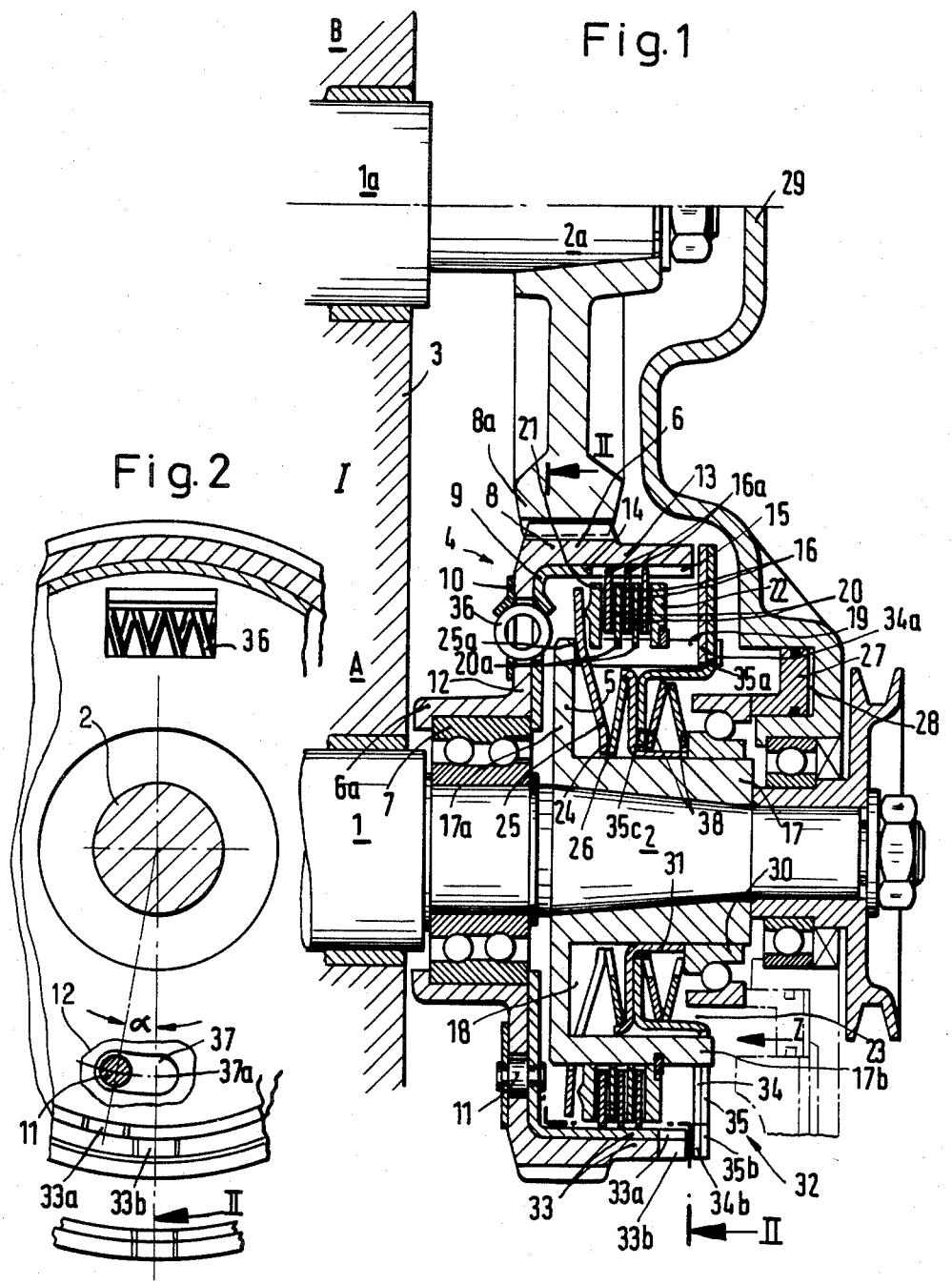

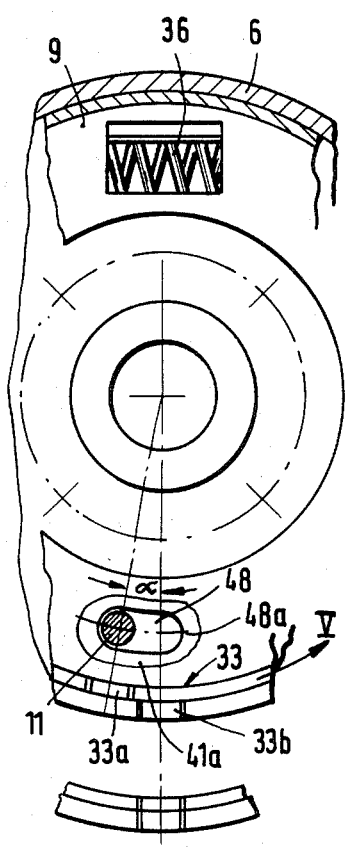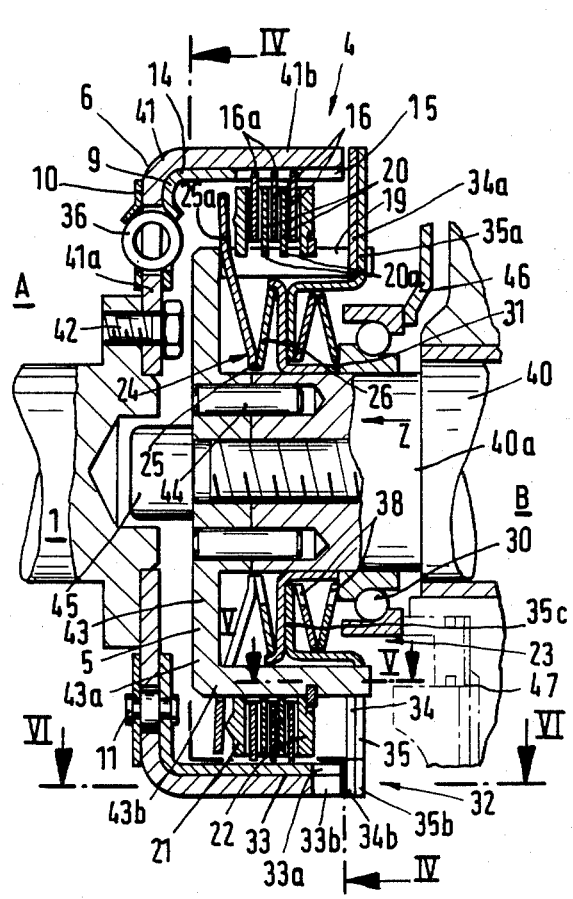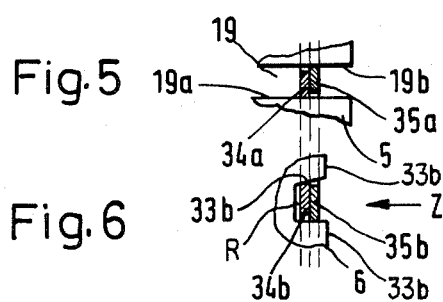

INTERNAL COMBUSTION ENGINE AND CLUTCH THEREFOR

BACKGROUND OF THE INVENTION

The present invention relates to improvements in internal combustion engines in general, and more particularly to improvements in so-called split engines. The invention further relates to improvements in friction clutches which can be used in split engines to accelerate one engine unit by transmitting thereto torque from another engine unit.

German Offenlegungsschrift No. 28 28 298 discloses a split internal combustion engine wherein a friction clutch is provided between the coaxial crankshafts of two discrete engine units one of which has a single cylinder and the other of which has two cylinders. The clutch renders it possible to engage the other engine unit with the first engine unit when the power requirements of the contrivance utilizing the split engine, such as a motor vehicle, increase and vice versa. The arrangement is such that each engine unit has its own camshaft and that the friction clutch transmits torque without slippage only when the camshaft of the accelerated other engine unit assumes a predetermined angular position with reference to the camshaft of the one engine unit. A drawback of the split engine which is disclosed in the Offenlegungsschrift is that the clutch cannot ensure full synchronization of the speeds of the engine units when the camshafts assume the aforementioned predetermined angular positions with reference to each other. This means that full engagement of the friction clutch can result in the generation of a pronounced shock which can entail serious damage to the clutch and/or to the parts of the engine units. Moreover, abrupt positive coupling of the two crankshafts to each other adversely affects the comfort of the occupant or occupants of the motor vehicle in which the split engine is put to use. Still further, the friction clutch which is disclosed in the Offenlegungsschrift is not always capable of transmitting full torque, especially if the shock which develops as a result of abrupt full engagement of the clutch entails the transmission of very pronounced torque from the one unit to the other unit or vice versa.

OBJECTS AND SUMMARY OF THE INVENTION

An object of the invention is to provide a novel and improved split internal combustion engine wherein the system for transmitting torque between the engine units is constructed and assembled in such a way that it can transmit pronounced torque as well as that it can establish a slippage-free connection between the various units only when the establishment of such connection is not accompanied by pronounced shocks which could result in damage to the torque-transmitting system and/or to the units of the engine.

Another object of the invention is to provide a novel and improved clutch which can be used in a split engine to accelerate the crankshaft of a first unit in response to rotation of the crankshaft of a second unit.

A further object of the invention is to provide the engine with a novel and improved mechanism for establishing a direct (slippage-free) torque-transmitting connection between the coaxial or parallel crankshafts of two discrete engine units in a split interal combustion engine.

An additional object of the invention is to provide a split engine wherein a first unit can be accelerated by an operative second unit within a surprisingly short intervals of time.

A further object of the invention is to provide the split engine with a novel and improved mechanism for directly transmitting torque between the units of a split engine without any angular play or other stray movements.

Still another object of the invention is to provide a split engine which is simpler than heretofore known split engines (including that disclosed in the aforementioned Offenlegungsschrift) and wherein the system for establishing a torque transmitting connection between various units of the engine is simpler, more compact and more reliable than those in conventional split engines.

A further object of the invention is to provide a split engine wherein the system for establishing a torque-transmitting connection between two separable engine units need not embody and need not be used jointly with complex measuring, monitoring and/or regulating or controlling means.

Another object of the invention is to provide a split engine wherein the transmission of torque from a first to a second unit can take place from crankshaft to crankshaft, from camshaft to camshaft or from any other first rotary member to any other second rotary member.

An additional object of the invention is to provide a novel and improved method of establishing a torque-transmitting connection between the units of a split internal combustion engine.

A further object of the invention is to provide a friction clutch which can be used in the aforediscussed engine and which is provided or cooperates with novel and improved means for preventing slippage when the ratio of rotational speeds of the units to be coupled to each other is within an optimum range.

Another object of the invention is to provide the split engine with novel and improved means for preventing the establishment of premature or untimely slippage-free connection between its units.

One feature of the invention resides in the provision of a split combustion engine which comprises a first unit having a first rotary member (e.g., a crankshaft), a second unit having a second rotary member (e.g., a crankshaft which may be parallel to or coaxial with the crankshaft of the first unit), an accelerating clutch which is interposed between the two units and serves to transmit torque from the first to the second rotary member to thus accelerate the second rotary member, locking means which is operable to transmit torque directly between the first and second rotary members, and control means which serves to delay the operation of the locking means until the acceleration of the second rotary member reaches a predetermined stage. For example, the control means can be arranged to effect the operation of the locking means (i.e., to bypass the customary path for transmission of torque by the accelerating clutch) when the RPM of the second rotary member exceeds the RPM of the first rotary member and the second rotary member overtakes the first rotary member by a predetermined angle (e.g., a relatively small acute angle).

The locking means can comprise a first component which is rotatable with the first rotary member and a second component which is rotatable with the second rotary member (but need not be coaxial therewith) and is coaxial with the first component. The clutch is then installed between the two components (i.e., it can transmit torque from one to the other of these components) and the locking means can comprise at least one locking element (e.g., a disc-shaped or sleeve-like element) which is rotatable with one of the components. The control means is then arranged to allow for torque-transmitting engagement between the locking element or elements and the other component when the second rotary member overtakes the first rotary member. It is preferred to construct and assemble the parts including the two components and the locking element or elements in such a way that the locking element or elements are engageable with the other component in a single angular position of the two components with reference to one another. The other component can constitute or include the control means, i.e., such control means can be incorporated into the locking means a portion of which, in turn, can form part of the accelerating clutch.

One of the two components of the clutch can also be said to form part of the control means and can be provided with first protuberances. The other component can be said to form part of the locking means and can be provided with second protuberances. The first protuberances include a pair of protuberances which are angularly movable within limits into and out of substantial register with one another. Such engine further comprises energy-storing means (e.g., one or more prestressed coil springs) for yieldably biasing the first protuberances of the aforementioned pair out of register with one another. In accordance with a first presently preferred embodiment, the other component is arranged to rotate with the first rotary member (which normally rotates and transmits torque to the second rotary member when the clutch is engaged); one of the first protuberances which constitute the aforementioned pair is then rigid with the first rotary member (to the extent that it shares the angular movements of the first rotary member) and the aforementioned biasing means serves to yieldably urge the other first protuberance of the pair out of register with the one first protuberance of such pair. The biasing means is operative to urge the other first protuberance of the aforementioned pair of first protuberances to a position ahead of the one first protuberance, as considered in the direction of rotation of the first rotary member. Alternatively, the other rotary component is arranged to rotate with the second rotary member and the biasing means is then arranged to urge the other first protuberance of the aforementioned pair to a position behind the one first protuberance, as considered in the direction of rotation of the second rotary member.

Another feature of the invention resides in the provision of an accelerating clutch which can be utilized to transmit torque from the rotary member (e.g., a crankshaft) of a first unit of a split engine to the rotary member (e.g., a crankshaft) of a second unit of such engine. The clutch comprises coaxial first and second rotary components one of which serves to accelerate the other when the clutch is engaged, and a pair of disc-shaped or sleeve-like locking elements provided on and coaxial with the first component. The locking elements are angularly movable relative to one another and have first entraining means engageable with second entraining means provided on the first component to thus prevent rotation of the locking elements with reference to the first component. The locking elements are further provided with first protuberances and the second component has complementary second protuberances engageable with the first protuberances for direct transmission of torque between the first and second components. Such clutch further comprises means (e.g., the clutch engaging mechanism and one or more springs interposed between the mechanism and the locking elements) for moving the first protuberances axially of the two components into engagement with the second protuberances in predetermined angular positions of the two components relative to each other. In accordance with a feature of the improved clutch, at least one of the entraining means and/or protuberances is designed and installed to change the angular positions of the locking elements relative to each other in response to axial movement of the first protuberances into engagement with the second protuberances. This feature can be resorted to in order to prevent any angular play between the locking elements on the one hand and the two components on the other hand and/or between the two locking elements when the first protuberances engage with the second protuberances to transmit torque directly from the first to the second component of the clutch or vice versa. To this end, the one entraining means and/or protuberance can have a conical or wedge-like configuration. The first entraining means are then arranged to engage the second entraining means, and the first protuberances engage the second protuberances in response to axial movement of the locking elements with reference to the first and second components. The first entraining means can comprise substantially radially extending projections which are provided on the locking elements and the first component is then provided with an axially extending slot flanked by surfaces which constitute or form part of the second entraining means. In such accelerating clutch, the second component can be provided with a recess which is flanked by the second protuberances and the first protuberances are then arranged to enter such recess in response to axial movement of the locking elements with reference to the first and second components. The second protuberances have surfaces flanking the recess in the second component and the first protuberances engage the surfaces of the second protuberances when the first protuberances extend into the recess. The surfaces which are adjacent to the recess are preferably inclined with reference to each other. The same preferably applies for the surfaces which flank the slot of the first component.

The novel features which are considered as characteristic of the invention are set forth in particular in the appended claims. The improved engine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary sectional view of a split internal combustion engine wherein the two engine units comprise parallel crankshafts which can be coupled to or disengaged from one another in accordance with a first embodiment of the invention;

FIG. 2 is a fragmentary sectional view as seen in the direction of arrows from the line II—II of FIG. 1;

FIG. 3 is a fragmentary sectional view of a second split engine wherein the crankshafts of the two engine units are coaxial with one another and can be coupled to or disengaged from each other in a different way;

FIG. 4 is a sectional view as seen in the direction of arrows from the line IV—IV of FIG. 3;

FIG. 5 is a fragmentary sectional view as seen in the direction of arrows from the line V—V of FIG. 3; and FIG. 6 is a fragmentary sectional view as seen in the direction of arrows from the line VI—VI of FIG. 3.

DESCRIPTION OF THE PREFERRED EMBODIMENTS

FIG. 1 shows a housing I which forms part of a split internal combustion engine and is common to the crankshafts (rotary members) 1 and 1a of two internal combustion engine units A and B. The end portions 2, 2a of the respective crankshafts 1, 1a extend beyond the wall 3 of the housing I. It is assumed that the internal combustion engine unit A is the one which is in use whenever the split engine is running, and that the unit B is started when the need arises. Such situation will develop when the improved split engine is used in a motor vehicle. Thus, the output range of the unit A should suffice to drive the vehicle under a number of circumstances, and the unit B is started and assists the unit A when the load increases accordingly. The split engine further comprises an accelerating clutch 4 which serves to accelerate the crankshaft 1a when the need arises so that the crankshafts 1 and 1a will jointly transmit torque to the front and/or rear wheels of the vehicle. Inversely, when the output of the unit A suffices to ensure proper operation of the vehicle, the clutch 4 is caused to disengage the crankshaft 1a from the crankshaft 1 so that the variable-speed transmission of the vehicle receives torque only from the unit A.

The accelerating clutch 4 comprises a first component 5 which is non-rotatably secured to the end portion 1a of the crankshaft 1, and a second component 6 which is coaxial with the component 5 and is rotatable relative thereto, i.e., the component 6 is rotatable with reference to the crankshaft 1. The component 6 comprises a sleeve-like portion or hub 6a which surrounds the outer race of an antifriction ball bearing 7 on the crankshaft 1, and a ring gear 8 which is integral with the hub 6a and meshes with a spur gear 8a non-rotatably mounted on the end portion 2a of the crankshaft 2. In addition to the hub 6a and ring gear 8, the component 6 comprises an entraining disc 9 at the right-hand side of a flange 12 and a second disc or counterdisc 10 at the left-hand side of the flange 12, as viewed in FIG. 1. The flange 12 also constitutes an integral part of the component 6 and is disposed between the hub 6a and the ring gear 8. The discs 9 and 10 are fixedly secured to each other by rivets 11 whose shanks extend through the flange 12. The disc 9 comprises a sleeve-like cylindrical portion 14 which is surrounded by a sleeve-like cylindrical portion 13 of the ring gear 8, i.e., of the component 6. The sleeve-like portion 14 of the disc 9 has one or more axially parallel slots 15 for radially outwardly extending projections or teeth 16a of laminations 16 forming part of the accelerating clutch 4. It will be noted that the projections 16a cooperate with the sleeve-like portion 14 of the disc 9 to ensure that the laminations 16 can move axially of but cannot rotate with reference to the component 6.

The component 5 of the accelerating clutch 4 has a hub 17 which is non-rotatably affixed to the end portion 2 of the crankshaft 1, and a flange 17a which extends from the hub 17 radially outwardly and the outer end portion of which is integral with a sleeve 17b that spacedly surrounds the hub 17. The parts 17, 17a and 17b define a ring-shaped chamber 18. The sleeve 17b has one or more axially parallel slots 19 for the projections (e.g., teeth) 20a of laminations 20 which alternate with the laminations 16, as considered in the axial direction of the crankshaft 1. The projections 20a ensure that the laminations 20 are free to move axially of but cannot rotate relative to the component 5. The latter further supports a pressure plate 21 which is non-rotatably but axially movably mounted thereon at one axial end of the set of alternating laminations 16, 20. The rightmost lamination of such set is adjacent to a stationary second pressure plate or counterpressure plate 22 which is mounted on the component 5. The pressure plate 21 has one or more projections in the form of teeth which extend into the slots 19 of the sleeve 17b to thus prevent rotation of the pressure plate 21 with reference to the component 5. The counterpressure plate 22 is also provided with tooth-like projections which extend into the slots 19 of the sleeve 17b. A split ring is recessed into the external surface of the sleeve 17b to hold the counterpressure plate 22 against axial movement in a direction to the right, as viewed in FIG. 1. When the pressure plate 21 is caused to move axially toward the counterpressure plate 22, the neighboring laminations 16, 20 are biased against each other with a progressively increasing force so that the component 5 transmits torque to the component 6 in order to accelerate the crankshaft 1a of the unit B through the medium of the gear 8a on the end portion 2a. The magnitude of torque which is transmitted to the crankshaft 1a depends upon the extent to which the pressure plate 21 is caused to move toward the counter-pressure plate 22, i.e., on the magnitude of friction between the neighboring laminations 16 and 20.

The actuating means 23 for the clutch 4, i.e., the means for moving the pressure plate 21 toward the counterpressure plate 22, is designed to act against the opposition of resilient means 24 which is installed in the ring-shaped chamber 18. Thus, the resilient means 24 ensures that the clutch 4 is disengaged in automatic response to termination of the application of that force (furnished by the actuating means 23) which tends to move the pressure plate 21 toward the counterpressure plate 22. FIG. 1 shows the clutch 4 in disengaged condition, i.e., the crankshaft 1 is free to rotate with reference to the crankshaft 1a.

The resilient means 24 comprises a first dished spring 25 and a second dished spring 26. The spring 25 comprises an inner annular portion which is adjacent to the radially innermost portion of the spring 26 at the periphery of the hub 17 of the component 5, an intermediate portion 25a which is disposed between the radially outermost portion of the flange 17a and the radially innermost portion of the pressure plate 21, and an annular outer portion which is outwardly adjacent to the intermediate portion 25a and abuts against an annular seat at the left-hand side of the pressure plate 21, as viewed in FIG. 1. The dished spring 25 can be said to perform the function of a two-armed lever which is fulcrumed at 25a, the inner arm of which is pivotable by the spring 26, and the outer arm of which can move the pressure plate 21 toward the counterpressure plate 22 in response to leftward movement of the spring 26, as viewed in FIG. 1. The spring 26 can be moved axially in a direction to the left, as viewed in FIG. 1, by the actuating means 23.

By properly selecting the magnitude of the force which the actuating means 23 transmits to the spring 26 and hence to the radially innermost portion of the spring 25, one can control the extent of axial movement of the pressure plate 21 toward the counter-pressure plate 22 and, consequently, the torque which the laminations 16 and 20 transmit from the component 5 to the component 6 of the accelerating clutch 4, i.e., the torque which is transmitted from the crankshaft 1 to the crankshaft 1a. The actuating means 23 comprises a piston 27 which is reciprocable in a cylinder chamber 28 defined by a casing 29 secured to the wall 3 of the crankshaft housing I. The means for admitting a pressurized fluid (e.g., oil) into the chamber 28 (in order to move the piston 27 toward the dished spring 26) is not specifically shown in the drawing. The piston 27 can displace the spring 26 by way of an antifriction ball thrust bearing 30 which surrounds and is movable axially of the hub 17. A sleeve 31 is interposed between the inner race of the bearing 30 and the spring 26. A set of prestressed dished springs 38 tends to move the piston 27 to the retracted position which is shown in FIG. 1.

The improved split engine further comprises a locking device 32 which is installed between the components 5, 6 of the accelerating clutch 4 and serves to positively couple the crankshafts 1 and 1a to each other when the acceleration of the crankshaft 1a by the crankshaft 1 (through the medium of the clutch 4) reaches a predetermined stage. The locking device 32 cooperates with control means 33 which is designed to prevent positive engagement between the clutch components 5 and 6 (via locking device 32) while the clutch 4 is in the process of accelerating the crankshaft 1a and before the acceleration of the crankshaft 1a reaches the aforementioned predetermined stage. In the illustrated embodiment, the locking device 32 is free to positively couple the crankshafts 1 and 1a to each other after the acceleration of the crankshaft 1a reaches a stage during which the component 6 has overtaken the component 5 by a certain angular distance denoted by the angle alpha which is shown in FIG. 2.

The locking device 32 comprises two disc-shaped locking elements 34, 35 which are non-rotatably connected with the component 5, i.e., with the crankshaft 1. To this end, the locking elements 34, 35 comprise entraining projections in the form of teeth 34a, 35a which extend into the slots 19 of the sleeve 17b forming part of the component 5. The entraining projections 34a, 35b are provided in the regions of the radially innermost portions of the respective locking elements 34, 35 and the radially outermost portions of these locking elements are provided with protuberances 34b, 35b which can engage complementary protuberances 33a, 33b of the control means 33. The protuberances 33b extend axially from the sleeve 13 of the gear 8, and the protuberances 33a extend axially from the sleeve 14 of the disc 9. The arrangement is such that the protuberances 33a have a certain limited freedom of angular movement with reference to the protuberances 33b and/or vice versa. The extent of such angular movement is determined by the length of one or more circumferentially extending arcuate slots 37 (one can be seen in the lower portion of FIG. 2) for the shanks of rivets 11 which fixedly connect the discs 9 and 10 to each other. The slots 37 are machined into or otherwise formed in the flange 12 of the component 6. An energy storing yieldable biasing device in the form of a coil spring 36 acting between the discs 9, 10 on the one hand and the flange 12 on the other hand (by being inserted into registering windows of the parts 9, 10 and 12) yieldably opposes angular movements of the discs 9, 10 relative to the flange 12 and vice versa. The extent to which the discs 9, 10 can turn relative to the flange 12 or vice versa is determined by the length of the slot 37 which is shown in FIG. 37 and such extent is indicated by the angle alpha.

The positions which the parts 9, 10 and 12 assume in FIG. 2 correspond to the positions of protuberances 33a, 33b of the control means 33 while the accelerating clutch 4 is disengaged as well as while the clutch 4 is in the process of accelerating the crankshaft 1a toward the aforementioned predetermined stage of acceleration. The spring 36 ensures that the protuberances 33a, 33b assume such positions in the absence of as well as during acceleration of the crankshaft 1a.

In order to move the protuberances 34b, 35b of the locking elements 34, 35 into proper engagement with the complementary protuberances 33a, 33b of the control means 33, the locking elements 34, 35 are movable axially by the actuating means 23. To this end, the locking element 35 comprises a cupped radially innermost portion 35c which engages the sleeve 31 surrounding the hub 17 of the component 5. The dished springs 38 are interposed between the inner race of the thrust bearing 30 and the radially outwardly extending portion of the sleeve 31 to act upon the cupped portion 35c of the locking element 35. The springs 38 urge the cupped portion 35c against the radially outwardly extending portion of the sleeve 31.

The relative angular positions of the protuberances 34b, 35b on the one hand and of the complementary protuberances 33a, 33b of the control means 33 are selected in such a way that the components 5, 6 (and hence the crankshafts 1, 1a) can be positively locked to each other in a single angular position within a complete 360-degree circle.

If the crankshaft 1a of the unit B is to be positively connected to the crankshaft 1 of the unit A, the chamber 28 receives a preferably hydraulic pressurized fluid to shift the piston 27 axially toward the flange 17a of the component 5 (see the arrow Z in FIG. 1). The piston 27 moves the thrust bearing 30 which, in turn, moves the sleeve 31 so that the latter shifts the dished spring 26 which causes the spring 25 to pivot about the fulcrum 25a and to move the pressure plate 21 axially toward the counterpressure plate 22. Thus, the laminations 16, 20 are moved toward each other to transmit torque from the component 5 (laminations 20) to the component 6 (laminations (16). The component 6 undergoes acceleration and accelerates the crankshaft 1a through the medium of the gear train 8, 8a.

Axial displacement of the piston 27 in response to admission of pressurized fluid into the chamber 28 further results in axial shifting of locking elements 34, 35 in the direction of arrow Z. Such axial movement of the locking elements 34, 35 is terminated when the protuberances 34b come into abutment with the sleeves 13, 14 of the gear 8 and disc 9. Further axial movement of the piston 27 in the direction of arrow Z entails a movement of the radially extending portion of the sleeve 31 away from the cupped portion 35c of the locking element 35 (under the action of the inner race of the thrust bearing 30) and the two locking elements 34, 35 are urged against the end faces of the parts 8, 9 (namely, against the end faces of the sleeves 13, 14) with a force which is furnished by the dished springs 38.

The normally existing angular displacement of the protuberances 33a, 33b relative to each other prevents premature locking of the component 5 to the component 6, i.e., premature interlocking of the protuberances 33a, 33b with the complementary protuberances 34b, 35b. The protuberances 33a, 33b remain out of proper alignment with and cannot engage the protuberances 34b, 35b as long as there exists a power flow from the crankshaft 1 to the crankshaft 1a via component 5, laminations 20, 16, discs 9, 10, rivet or rivets 11 and gears 8, 8a, i.e., as long as the crankshaft 1a is in the process of being accelerated by the crankshaft 1 via clutch 4. Such situation prevails while the RPM of the unit A exceeds that of the unit B as well as while the RPM of the unit A matches the RPM of the unit B. The protuberances 34b slide along the end faces of the sleeves 13 and 14 as long as the RPM of the unit A exceeds that of the unit B. In order to shorten the interval of time which is required for acceleration of the unit B, it is desirable to start the operation of the cylinder or cylinders which form part of the unit B before the locking device 32 becomes effective. In other words, the admission of fuel into the cylinder or cylinders of the unit B and the combustion of injected fuel can begin before the RPM of the unit B reaches or exceeds the RPM of the unit A.

When the previously idle engine unit B is started, its RPM increases as a result of combustion of fuel in its cylinder or cylinders and the transmission of torque to the crankshaft 1a by means other than the clutch 4. Thus, the RPM of the crankshaft 1a rises and ultimately exceeds that of the crankshaft 1, i.e., the crankshaft 1a overtakes the crankshaft 1 whereby the direction of power flow is reversed, i.e., the crankshaft 1a tends to drive the crankshaft 1 by way of the gears 8a and 8. This causes the flange 12 of the gear 8 to turn relative to the discs 9, 10 (see the arrow II in FIG. 2) against the opposition of the prestressed spring 36 so that the rivet 11 enters the end portion 37a of the slot 37. Consequently, the positions of the protuberances 33b (on the sleeve 13) relative to the protuberances 33a (on the sleeve 14) are changed through the angle alpha, i.e., the protuberances 33b register with the protuberances 33a and the control means 33 ceases to be operative because it ceases to prevent the establishment of a positive torque-transmitting engagement between the crankshafts 1, 1a, namely, between the components 5, 6 of the clutch 4. The springs 38 are then free to move the locking elements 34, 35 axially and to interlock the protuberances 34b, 35b with the mutually aligned protuberances 33b, 33a of the sleeves 13, 14.

As already mentioned above, the distribution of protuberances 34b, 35b at the peripheries of the locking elements 34, 35 and of protuberances 33a, 33b at the axial ends of the sleeves 14, 13 is such that the protuberances 33a, 33b, can interlock with the protuberances 34b, 35b in a single angular position of the component 5 with reference to the component 6. To this end, the extent of engagement of the accelerating clutch 4 is regulated in such a way that the laminations 16, 20 are free to slip relative to each other to a certain extent when the RPM of the crankshaft 1a exceeds that of the crankshaft 1, i.e., the torque which is required to effect such slippage of the laminations 16, 20 relative to each other exceeds the torque which is necessary to effect a deformation of the spring 36 and hence a deactivation of the control means 33. Since the laminations 16, 20 can slip relative to each other, the protuberances 34b, 35b are free to move angularly relative to the protuberances 33a, 33b so that, in the aforementioned single angular position of the components 5, 6 relative to each other, the locking elements 34, 34 are free to move axially under the action of the dished springs 38 and to move their protuberances 34b, 35b into locking engagement with the protuberances 33a, 33b of the sleeves 14, 13. The engagement is or can be abrupt and takes place in immediate response to assumption of the components 5, 6 of the aforementioned single predetermined angular positions with reference to each other.

The operation of the improved locking device 32 is based on the recognition that the acceleration of the unit B by the unit A, especially if the cylinder or cylinders of the unit B are fired prior to completion of the accelerating step, is bound to reach a stage when the speeds of the two units are the same as well as a stage when the speed of the unit B slightly exceeds the speed of the unit A (such as is necessary to enable the unit B to overtake the unit A by a predetermined angle). The overtaking can be attributed to acceleration of the unit B exclusively by the unit A, to starting of operation of the unit B prior to completion of acceleration to the speed which is required to establish a direct torque-transmitting connection between the units A and B, and/or to temporary deceleration of the unit A. Acceleration of the unit B to a speed at which this unit overtakes the unit A is of short duration and cannot be overly pronounced since the control means 33 enables the locking device 32 to establish a direct torque-transmitting connection between the crankshafts 1 and 1a in response to angular displacement of the flange 12 through a relatively small angle (alpha) with reference to the discs 9 and 10. Deactivation of the control means 33 (i.e., start of operation of the locking device 32) can be triggered by transmission of torque from the unit B to the unit A, i.e., by a reversal of the direction of power flow between the crankshafts 1 and 1a, and such transmission of torque will or can take place if the unit B is started (i.e., the combustible mixture in its cylinder or cylinders is ignited) prior to completion of the accelerating step by the clutch 4 alone.

The components 5, 6 can be said to constitute two constituents of the clutch 4 or two constituents of the locking device 32. It will be noted that the component 6 (namely, that component which does not carry the locking elements 34, 35 of the locking device 32) includes the control means 33 (namely, the protuberances 33a, 33b). The protuberance 33b is rigid with the crankshaft (rotary member) 1, and the spring 36 urges the protuberance 33a to a position ahead of the protuberance 33b (see FIG. 2), as considered in the direction of rotation of the crankshaft 1. In FIG. 2, the crankshaft 1 rotates in the direction which is indicated by the arrow II.

Each of the sleeves 14, 13 can have a single protuberance (33a, 33b) or two or more protuberances which are suitably distributed in the circumferential direction of the respective sleeve. Since the protuberances 34b, 35b of the locking elements 34, 35 which are shown in FIG. 1 are tooth-shaped projections, each of the protuberances 3a, 33b can have a recess or tooth space for reception of the protuberances 34b, 35b when the locking elements 34, 35 are free to move axially of the components 5, 6 subsequent to movement of the recess which is defined by the protuberance 33b into register with the recess which is defined by the protuberance 33a. Thus, in the embodiment of FIGS. 1 and 2, each of the protuberances 33a, 33b can be said to be a two-piece part including two tooth flanks at the opposite sides of the respective recess.

The provision of one or more springs 36 serves several purposes. First of all, such spring or springs prevent premature deactivation of the control means 33, i.e., premature establishment of a direct torque-transmitting connection between the components 5 and 6 (rather than by way of the laminations 16 and 20). Secondly, the spring or springs 36 ensure that the protuberances 33a, 33b of the control means 33 are moved out of register as soon as the clutch 4 is disengaged, i.e., as soon as the springs 38 are free to move the locking elements 34, 35 axially of the components 5 and 6 in a direction (counter to that indicated by the arrow Z in FIG. 1) to extract or expel the protuberances 34b, 35b from the recesses of the protuberances 33a, 33b. Thus, the activation of control means 33 takes place automatically as soon as the locking device 32 becomes inoperative, and the control means 33 then continues to prevent renewed operation of the locking device 32 until and unless the above outlined circumstances arise again, namely, that the crankshaft 1a slightly overtakes the crankshaft 1 through an angle such that the angular position of the flange 12 relative to the discs 9, 10 changes by the angle alpha. Such mode of operation is desirable and advantageous because the improved split engine need not be provided with any means for activating or deactivating the control means 33, i.e., the activation and deactivation of the control means take place automatically without necessitating any attention on the part of the operator of the vehicle which embodies the split engine. Thus, the RPM of the crankshaft 1 and/or 1a need not be monitored by tachometer generators and/or other detector means; there is no need to provide revolution counters and/or other devices which would indicate the optimum timing of activation or deactivation of the control means; and there is no need for the provision of remote-control connections between the control means 33 and pedals, knobs or like elements which are to be manipulated by the operator.

The split engine which is shown in FIGS. 3 and 4 departs from the split engine of FIGS. 1 and 2 in that the crankshaft (rotary member) 1 of the first unit A is coaxial with the crankshaft (rotary member) 40 of the second unit B. The component 5 of the accelerating clutch 4 between the crankshafts 1 and 40 is mounted on the end portion 40a of the crankshaft 40, i.e., of the crankshaft belonging to the unit (B) which can be idled and is coupled to the unit A only when the latter cannot provide the required output, e.g., to drive a motor vehicle. The component 6 of the clutch 4 is non-rotatably secured to the crankshaft 1 of the unit A.

The component 6 comprises a cupped portion 41 with a radially extending flange 41a and a cylindrical sleeve 41b at the radially outermost end of the flange 41a. The flange 41a is secured to a radially outwardly extending flange of the crankshaft 1 by bolts 42 or other suitable fasteners. As can be seen in FIG. 3, the flange 41a of the cupped portion 41 of the component 6 is flanked by two discs 9, 10 which are secured to each other by one or more rivets 11 extending through arcuate slots 48 of the flange 41a. An energy storing biasing device in the form of a prestressed coil spring 36 is installed in registering windows of the parts 9, 10 and 41a to normally hold the discs 9, 10 and the flange 41a in the mutual angular positions shown in FIG. 4. The disc 9 has a cylindrical sleeve 14 which is inwardly adjacent to and coaxial with the sleeve 41b of the cupped portion 41. The sleeve 14 has axially parallel slots 15 for the tooth-shaped projections 16a of laminations 16 which are installed within the confines of the sleeve 14 and alternate with laminations 20. The laminations 16 are free to move axially of the sleeve 14 and of the entire component 6 but are held against rotation relative thereto.

The component 5 of the accelerating clutch 4 comprises a cupped portion 43 which is non-rotatably secured to the smaller-diameter end portion 40a of the crankshaft 40 by axially parallel pins 44 and a coaxial bolt 45. The cupped portion 43 comprises a radially extending flange 43a and a cylindrical sleeve 43b at the periphery of the flange 43a. The sleeve 43b has one or more axially parallel slots 19 for the inwardly extending tooth-like projections 20a of the laminations 20. Thus, whereas the laminations 16 are free to move axially of but cannot rotate relative to the component 6, the laminations 20 are mounted in a similar manner on the component 5 of the clutch 4.

The cupped portion 43 of the component 5 carries a tiltable pressure plate 21 as well as a counterpressure plate 22. The laminations 16, 20 are disposed between the pressure plates 21, 22 and can be urged against each other by the pressure plate 21 when the latter is caused to move its radially outermost portion in a direction toward the counterpressure plate 22. The counterpressure plate 22 is held against axial movement in a direction away from the pressure plate 21 in a manner as described in connection with the counterpressure plate 22 in FIG. 1. Thus, the plate 22 has one or more projections in the form of teeth which extend into the slot or slots 19 of the sleeve 43b, and the plate 22 is in abutment with a split ring which is recessed into the periphery of the sleeve 43b.

The clutch 4 can be engaged by an actuating means 23 which is arranged to act upon the pressure plate 21 by way of resilient means 24 so as to transmit torque from the crankshaft 1 to the crankshaft 40. The resilient means 24 comprises a first dished spring 25 which acts not unlike a two-armed lever and is fulcrumed at 25a. The outer lever of the spring 25 can engage the pressure plate 21, and its inner lever is in engagement with a second dished spring 26 of the resilient means 24. The fulcrum 25a is provided by the flange 43a of the cupped portion 43. When the actuating means 23 is idle, the outer arm of the dished spring 25 allows the pressure plate 21 to move away from the counterpressure plate 22 so that the laminations 16, 20 cannot transmit torque between the components 5 and 6.

The actuating means 23 comprises a mechanical actuator in the form of a bifurcated member 46 which can engage the outer race of a thrust bearing 30 surrounding the end portion 40a of the crankshaft 40 and/or a hydraulic motor 47 which is indicated by phantom lines in the lower right-hand portion of FIG. 3. The thrust bearing 30 can move the pressure plate 21 axially toward the counterpressure plate 22 through the medium of a sleeve 31 and dished springs 26, 25 of the resilient means 24.

The locking device 32 between the components 5 and 6 of the accelerating clutch 4 of FIGS. 3 and 4 serves to ensure that the transmission of torque between the crankshafts 1 and 40 takes place without any slippage, i.e., that the unit B can assist the engine unit A in driving a motor vehicle or the like when the circumstances are such that the unit A alone cannot do the job. The locking device 32 again comprises or is operatively connected with a control means 33 which ensures that the locking device 32 cannot become operative during acceleration of the crankshaft 40 to the RPM of the crankshaft 1 as well as when the RPM of the crankshaft 40 matches that of the crankshaft 1. Thus, the same as in the embodiment of FIGS. 1 and 2, the crankshaft 40 must overtake the crankshaft 1 to a certain extent before the locking device 32 is free to establish a positive torque-transmitting connection between the components 5 and 6 of the clutch 4.

The locking device 32 comprises two disc-shaped locking elements 34 and 35 which are non-rotatably connected with the unit B and more specifically with the cupped portion 43 of the component 5. To this end, the radially innermost portions of the locking elements 34, 35 are respectively provided with tooth-shaped entraining projections 34a, 35b which extend into the slot or slots 19 of the sleeve 43b forming part of the cupped portion 43. The radially outermost portions of the locking elements 34, 35 are respectively provided with tooth-shaped protuberances 34b, 35b which are caused to mate with complementary protuberances 33a, 33b of the control means 33 when the flange 41a assumes a single predetermined angular position with reference to the discs 9, 10 of the component 6. The protuberances 33a, 33b respectively extend axially beyond the right-hand end faces of the sleeves 14 and 41b, as viewed in FIG. 3. When the locking device 32 is inoperative, the protuberances 33a are staggered with reference to the protuberances 33b, as considered in the circumferential direction of the clutch 4, under the action of the energy storing coil spring 36. The extent to which the protuberances 33a and 33b can move angularly relative to each other is determined by the length of slot or slots 48 in the flange 41a because such slots are traversed by the shanks of the respective rivets 11 which rigidly connect the discs 9 and 10 to one another. The maximum extent of angular displacement of the discs 9, 10 relative to the flange 41a or vice versa is indicated by the angle alpha which is shown in FIG. 4. When the parts 9, 10 and 41a assume the angular positions which are shown in FIG. 4, the accelerating clutch 4 is disengaged or is in the process of accelerating the crankshaft 40, i.e., in the process of transmitting torque from the crankshaft 1 to the component 5. The bias of the prestressed spring 36 suffices to maintain the shank of the illustrated rivet 11 in the left-hand portion of the slot 48 which is shown in FIG. 4 so that the protuberances 33a and 33b are out of register with one another.

The actuating means 23 serves to engage the protuberances 34b, 35b with the complementary protuberances 33a, 33b as soon as the protuberances 33a are moved into accurate register with the protuberances 33b. As can be seen in FIG. 3, the locking element 35 comprises a cupped portion 35c which is disposed radially inwardly of the protuberances 34b, 35b and abuts against the sleeve 31 which latter is movable axially by the inner race of the thrust bearing 30. A set of dished springs 38 is interposed between the inner race of the bearing 30 and the radially extending flange of the cupped portion 35c. The springs 38 react against the inner race of the bearing 30 and tend to move the protuberances 35b toward the sleeves 14 and 41b, i.e., to urge the protuberances 34b against the adjacent end faces of the sleeves 14 and 41b.

As mentioned above, the protuberances 33a, 33b can mate with the protuberances 34b, 35b in a single angular position of the component 5 with reference to the component 6. At such time, the shank of the rivet 11 which is shown in FIG. 4 must be disposed in the right-hand end portion 48a of the respective slot 48. This is the only position in which the crankshafts 1 and 40 can be positively connected to each other without any slippage.

The mode of operation of the split engine which is shown in FIGS. 3 and 4 is as follows:

If the crankshaft 40 of the unit B is to be accelerated by the rotating crankshaft 1 of the first unit A in order to start the second unit so that the combined output of the two units can be utilized for propulsion of a motor vehicle or the like, the thrust bearing 30 is moved axially in a direction to the left, as viewed in FIG. 3, either by the bifurcated actuator 46 or by the hydraulic motor 47. The bearing 30 is moved in the direction of arrow Z (see the upper half of FIG. 3) to shift the sleeve 31 in the same direction whereby the sleeve 31 causes the dished spring 26 to pivot the dished spring 25 at the fulcrum 25a so that the outer arm of the spring 25 moves the pressure plate 21 toward the counterpressure plate 22 and the laminations 16, 20 begin to transmit torque from the component 6 to the component 5. The thrust bearing 30 also shifts the locking elements 34, 35 in the direction of arrow Z so that the locking element 35 bears against the locking element 34 and the protuberances 34b of the locking element 34 bear against the adjacent end faces of the sleeves 14 and 41b. As the bearing 30 continues to move in the direction of the arrow Z, the sleeve 31 shares the leftward movement of the bearing (as viewed in FIG. 3) and its radially extending portion moves away from the cupped portion 35c of the locking element 35. At the same time, the axially moving bearing 30 stresses the dished springs 38 which urge the locking element 35 against the locking element 34 with a progressively increasing force, i.e., the protuberances 34b bear with a progressively increasing force against the end faces of the sleeves 14 and 41b. However, the locking device 32 remains ineffective because the protuberances 33a, 33b are still angularly offset relative to each other due to the fact that the spring 36 continues to maintain the shank of the rivet 11 of FIG. 4 in the illustrated position, i.e., in the left-hand end portion of the respective arcuate slot 48. Thus, the spring 36 ensures that the locking device 32 cannot establish a positive torque-transmitting connection between the components 5 and 6 of the clutch 4 before the crankshaft 40 is accelerated to the speed of and actually overtakes the crankshaft 1. When the locking device 32 is free to prevent relative angular movements between the crankshafts 1 and 40, the cupped portion 41 on the crankshaft 1 is positively locked to the cupped portion 43 on the crankshaft 40. The locking device 32 cannot become operative as long as the flow of power takes place from the cupped portion 41 (i.e., from the engine A and its crankshaft 1), by way of the rivet or rivets 11, discs 9, 10, laminations 16, 20 and to the cupped member 43 (i.e., to the crankshaft 40 of the engine unit B), namely, as long as the first unit A must perform the function of accelerating the crankshaft 40 of the second unit B. At such time, the protuberances 34b, 35b of the locking elements 34, 35 slide along the adjacent end faces of the sleeves 14 and 41b (actually, the protuberances 35b abut against the protuberances 34b and the protuberances 34b slip relative to the end faces of the sleeves 14, 41b) but cannot mate with the protuberances 33a, 33b of the control means 33.

When the second unit B is started and its RPM increases so that it at first matches and thereupon exceeds the RPM of the unit A, the crankshaft 40 begins to transmit torque to the crankshaft 1, i.e., there develops a flow of power from the cupped portion 43 toward the discs 9, 10 with the result that the angular position of the flange 41a with reference to the discs 9, 10 is changed against the opposition of the spring 36 and through the angle alpha (see the arrow V in FIG. 4). This moves the protuberances 33a into exact register with the protuberances 33b so that the protuberances 33a, 33b can be engaged by the protuberances 34b, 35b under the action of the dished springs 38 whereby the locking device 32 becomes operative to establish a positive torque-transmitting connection between the crankshafts 1 and 40, i.e., between the cupped portions 41 and 43. At such time, the shank of the rivet 11 which is shown in FIG. 4 is located in the right-hand end portion 48a of the respective slot 48.

As already explained above, the protuberances 33a, 33b of the control means 33 can mate with the complementary protuberances 34b, 35b in a single angular position of the cupped portions 41, 43 with reference to each other. This is readily achievable by resorting to irregular distribution of the protuberances, as considered in the circumferential direction of the sleeve 41b. Slippage between the neighboring laminations 16 and 20 is selected in such a way that the torque which the unit B transmits to the unit A (such torque causes slippage between the laminations 16 and 20) exceeds the force which is required to deform the spring 36 in a sense to enable the protuberances 33a to move into register with the protuberances 33b. Thus, the protuberances 33a, 33b can move into register with one another in immediate response to start of the transmission of torque from the unit B to the unit A, and the thus aligned protuberances 33a, 33b can mate with the protuberances 34b, 35b as soon as the cupped portions 41 and 43 assume the aforementioned single predetermined angular positions with reference to each other. The energy which is stored by the dished springs 38 is sufficient to effect an abrupt engagement between the protuberances 34b, 35b of the locking elements 34, 35 and the then registering protuberances 33a, 33b of the control means 33.

In the embodiment of FIGS. 3 and 4, the locking elements 34, 35 (and hence the protuberances 35b, 35b) are provided on the component 5 which rotates with the crankshaft 40. The spring 36 biases the protuberance 33a of the control means 33 to a position behind the protuberance 33b, as considered in the direction (arrow V) of rotation of the crankshaft 40.

The mode of operation of the locking device 32 will be explained again with reference to FIGS. 5 and 6. In order to ensure that the transmission of torque between the crankshafts 1 and 1a (FIGS. 1-2) or 1 and 40 (FIGS. 3-4) will take place without any or without excessive play, the entraining projections 34a, 35a of the locking elements 34, 35 are held in the slots 19 without any freedom of movement in the circumferential direction of the sleeve 43b when the protuberances 34b, 35b are free to mate with the protuberances 33a, 33b of the control means 33. This can be readily achieved by ensuring that the axial movement of protuberances 34b, 35b on the locking elements 34, 35 into engagement with the protuberances 33a, 33b of the control means 33 entails a certain angular displacement of the locking elements 34, 35 relative to each other to thus ensure that the entraining projections 34a, 35a of these locking elements cannot wobble in the respective slots 19 as soon as the control means 33 allows the locking device 32 to become operative for direct transmission of torque between the cupped portions 41 and 43, i.e., between the components 5, 6 of the accelerating clutch 4 (at such time, the transmission of torque need not take place by way of the laminations 16, 20). In other words, the entraining projections 34a, 35a are urged against the entraining surfaces 19a, 19b bounding the slots 19 so that the transmission of torque between the locking elements 34, 35 and the cupped portion 43 takes place without any play.

In order to achieve such transmission of torque between the cupped portions 41 and 43 without any play, the protuberances 33b of the control means 33 preferably resemble cones or wedges which taper in the direction indicated by the arrow Z of FIG. 6. Furthermore, the protuberances 34b, 35b as well as the entraining projections 34a, 35a of the locking elements 34, 35 are distributed and configurated in such a way that they can cooperate with the respective portion of the clutch 4 in a single direction, i.e., that they can act upon the respective clutch portion in a clockwise or in a counterclockwise direction but not in both directions. This is achieved in that at least the width of the protuberances 34b, 35b is less than the available width of the cone- or wedge-shaped recesses R between the complementary protuberances 33b. At the same time, the combined width of entraining projections 34a, 35a (see FIG. 5) which respectively act upon the complementary entraining surfaces 19a, 19b flanking the respective slots 19 (the projections 34a and 35a act in opposite directions, i.e., the projection 34a bears against the surface 19a of FIG. 5 and the projection 35a bears against the surface 19b) exceeds the width of the narrower portions of the cone- or wedge-shaped complementary protuberances 33b which cooperate therewith. Still further, the entraining projections 34a, 35b and the protuberances 34b, 35b are distributed on the locking elements 34, 35 in such a way that a reduction of the combined width of composite teeth formed by the protuberances 34b, 35b entails a widening of composite teeth which are formed by the entraining projections 34a, 35a. This means that those flanks of the entraining projections 34a, 35a which engage the complementary entraining surfaces 19a, 19b flanking the respective slots 19 are urged to move further apart whereas those flanks of the protuberances 34b, 35b which cooperate with the wedge-or cone-like complementary protuberances 33b are urged toward each other.

FIGS. 5 and 6 further show. that the entraining projections 34a, 35a and the protuberances 34b, 35b of the locking elements 34, 35 cooperate with the clutch components 5 and 6 in different directions (as considered circumferentially of the components 5 and 6).

A positive (form-locking) connection between the components 5 and 6 is ensured by the dished springs 38 which are free to move the locking elements 34, 35 in the direction of arrow Z as soon as the control means 33 permits such axial movement of the locking elements, i.e., as soon as the protuberances 33a, 33b are in requisite alignment with each other. In view of the cone- or wedge-like configuration of the protuberances 33b, the protuberances 34b and 35b (and hence also the locking elements 34, 35) are moved angularly relative to each other until the entraining projections 34a, 35a engage the respective entraining surfaces 19a, 19b in the corresponding slots 19 of the component 5. The remaining bias of the dished springs 38 suffices to thereupon continue to maintain the locking elements 34, 35 in angularly offset positions relative to each other so that the entraining projections 34a, 35b continue to bear respectively against the entraining surfaces 19a, 19b in the corresponding slots 19. The axial movement of the locking elements 34, 35 in the direction of arrow Z is terminated as soon as the projections properly engage the respective surfaces 19a, 19b.

An important advantage of the just discussed establishment of direct connection between the components 5 and 6 without any play, and of the provision of prestressed dished springs 38 (which retain some residual bias when the locking elements 34, 35 are already free to establish a direct torque-transmitting connection between the components 5 and 6) is that progressive wear upon the entraining projections 34a, 35a and protuberances 34b, 35b of the locking elements and/or upon the complementary protuberances 33a, 33b of the locking means 33 cannot bring about the development of any play because the springs 38 automatically compensate for such wear and continue to maintain the locking elements 34, 35 in optimum positions with reference to each other and with reference to the adjacent parts. Thus, as the wear upon the projections and protuberances of the locking elements 34, 35 and/or control means 33 increases, the springs 38 simply cause the locking elements 34, 35 to move further in the direction of the arrow Z. This results in further angular displacement of the locking elements 34, 35 relative to each other and ensures the transmission of torque from the component 5 to the component 6 or vice versa without any play.

The inclination of the cone- or wedge-like protuberances 33b is selected with a view (i.e., it is sufficiently large) to ensure that the action of locking elements 34, 35 is outside of the self-locking range. In other words, the inclination of protuberances 33b is selected in such a way that the locking elements 34, 35 are free to become separated from the control means 33 as soon as the clutch 4 is disengaged.

As utilized herein, the expression "cone-or wedge-shaped" is intended to further embrace all similar or analogous configurations including spherical, pyramidal, etc. All that counts is to ensure that the locking elements 34, 35 are caused to change their angular positions relative to one another as a result of their movement axially of the components 5, 6 so that the entraining surfaces 19a, 19b can cooperate with the entraining projections 34a, 35a in a sense to prevent wobbling of the locking elements 34, 35 relative to the components 5, 6 when the protuberances 24b, 35b of the locking elements cooperate with the complementary protuberances 33a, 33b of the locking means 33 to allow for direct transmission of torque between the crankshafts 1, 1a or 1, 40. It is immaterial whether the wedge- or cone-shaped configurations are provided on the entraining means and/or on the protuberances; they should be capable of effecting angular movements of the locking elements 34, 35 relative to each other and preferably in opposite directions to thus eliminate the likelihood of any play between the components 5, 6 as well as to compensate for progressing wear upon the entraining means and/or protuberances.

The clutch 4 can be installed between the camshafts (not shown) of the units A, B or between other rotary members of the two units.

Somewhat similar engines are disclosed in commonly owned U.S. Pat. Nos. 4,367,703 and 4,367,704.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A split combustion engine, comprising a first engine unit having a first rotary member; a second engine unit having a second rotary member; and an accelerating clutch interposed between said units and arranged to transmit torque from said first to said second rotary member to thus accelerate said second rotary member, said clutch comprising coaxial first and second rotary components one of which is arranged to accelerate the other when the clutch is engaged, locking means including a pair of locking elements provided on and coaxial with said first component, said locking elements being angularly movable relative to one another and having first entraining means, said first component having second entraining means engageable with said first entraining means to prevent rotation of said locking elements with reference to said first component, said locking elements further having first protuberances and said second component having control means including complementary second protuberances engageable with said first protuberances for direct transmission of torque between said components, and means for moving said first protuberances axially of said components into engagement with said second protuberances, at least one of said entraining means and/or protuberances being arranged to change the angular positions of said locking elements relative to one another in response to axial movement of said first protuberances into engagement with said second protuberances.

2. The engine of claim 1, wherein said control means is arranged to effect the operation of said locking means when the RPM of said second rotary member exceeds the RPM of said first rotary member and said second rotary member overtakes said first rotary member by a predetermined angle.

3. The engine of claim 2, wherein each of said rotary members comprises a crankshaft.

4. The engine of claim 2. wherein said control means is arranged to allow for torque-transmitting engagement between said locking elements and said second component when said second rotary member overtakes said first rotary member.

5. The engine of claim 4, wherein said locking elements are engageable with said second component in a single angular position of said components with reference to said one another.

6. The engine of claim 4, wherein said second component includes said control means.

7. The engine of claim 2, wherein said second protuberances are angularly movable within limits into and out of substantial register with one another.

8. The engine of claim 7, further comprising means for yieldably biasing said second protuberances out of register with one another.

9. The engine of claim 7, wherein said second rotary component is arranged to rotate with said first rotary member, one of said second protuberances being rigid with said first rotary member and further comprising means for yieldably biasing the other of said second protuberances out of register with said one second protuberance.

10. The engine of claim 9, wherein said first rotary member is arranged to rotate in a predetermined direction as said biasing means is operative to urge said other second protuberance to a position ahead of said one second protuberance, as considered in said direction.

11. The engine of claim 7, wherein said second component is arranged to rotate with said second rotary member, one of said second protuberances being rigid with said first rotary member and further comprising biasing means for yieldably urging the other of said second protuberances out of register with said one second protuberance.

12. The engine of claim 11, wherein said second rotary member is arranged to rotate in a predetermined direction and said biasing means is operative to urge said other second protuberance to a position behind said one second protuberance, as considered in said direction.

13. An accelerating clutch, particularly for transmitting torque from the rotary member of a first unit of a split engine to the rotary member of a second unit of such engine, comprising coaxial first and second rotary components one of which is arranged to accelerate the other when the clutch is engaged; a pair of locking elements provided on and coaxial with said first component, said locking elements being angularly movable relative to one another and having first entraining means, said first component having second entraining means engageable with said first entraining means to prevent rotation of said locking elements with reference to said first component, said locking elements further having first protuberances and said second component having complementary second protuberances engageable with said first protuberances for direct transmission of torque between said components; and means for moving said first protuberances axially of said components into engagement with said second protuberances, at least one of said entraining means and/or protuberances being arranged to change the angular positions of said locking elements relative to one another in response to axial movement of said first protuberances into engagement with said second protuberances.

14. The clutch of claim 13, wherein said one entraining means and/or protuberance has a cone- or wedge-like configuration.

15. The clutch of claim 13, wherein said first entraining means are arranged to engage said second entraining means and said first protuberances are engageable with said second protuberances in response to axial movement of said locking elements with reference to said components.

16. The clutch of claim 15, wherein said first entraining means comprises substantially radially extending projections provided on said locking elements and said first component has an axially extending slot and surfaces flanking said slot, said projections extending into said slot and said surfaces constituting said second entraining means.

17. The clutch of claim 16, wherein said second component has a recess flanked by said second protuberances and said first protuberances are arranged to enter said recess in response to axial movement of said locking elements with reference to said components.

18. The clutch of claim 17, wherein said second protuberances have surfaces adjacent to said recess and said first protuberances abut against such surfaces when the first protuberances extend into said recess.

19. The clutch of claim 18, wherein the surfaces which are adjacent to said recess are inclined with reference to each other.

20. The clutch of claim 16, wherein said surfaces are inclined with reference to each other.

21. The clutch of claim 13, wherein said moving means is arranged to move said first protuberances axially of said components into engagement with said second protuberances in a predetermined angular position of said components with reference to each other.

* * * * *